March 4, 1969 W. K. RALSTON ET AL 3,430,554

SELF-STRIPPING WIRE TWISTER HOOK FOR WIRE BALERS

Filed Nov. 1, 1966

INVENTORS
William K. Ralston
Bill R. Littlejohn

ATTY

United States Patent Office 3,430,554
Patented Mar. 4, 1969

3,430,554
SELF-STRIPPING WIRE TWISTER HOOK
FOR WIRE BALERS
William K. Ralston and Bill R. Littlejohn, Memphis,
Tenn., assignors to International Harvester Company,
Chicago, Ill., a corporation of Delaware
Filed Nov. 1, 1966, Ser. No. 591,156
U.S. Cl. 100—31    4 Claims
Int. Cl. B65h 13/28

ABSTRACT OF THE DISCLOSURE

This invention relates to a self-stripping wire twister hook which is to be used in a hay baler. It is the intention of the invention to provide a twister which will dislodge the wire twist from the hook without the use of a separate stripper finger. The hook has a shank portion, a laterally extending portion, and an outer portion extending obliquely in a direction generally outwardly and downwardly from the axis of rotation of the hook.

---

This invention relates to a twisting mechanism of the general type used in hay balers and more particularly to an improvement in a twister hook for such a twisting mechanism.

The preferred embodiment of the present invention as disclosed herein contemplates that the novel twister hook be incorporated in a twisting mechanism of the type shown in the Raney Patent 2,513,967 issued July 4, 1950. In the twisting mechanism disclosed therein a twister hook is used for twisting the ends of a strand of wire encircling a bale of hay formed in a baler. At the conclusion of the twisting phase, the twister hook is positioned in a direction transverse to that of bale movement. Therefore, in order to dislodge the wire twist from the twister hook thereby allowing through movement of the bale rearwardly, a stripper finger moving in the direction of orientation of the hook forces the wire twists past the end of the hook. The use of a stripper finger as a means for stripping the twisted wire from a hook is undesirable because it increases the complexity of an already complex mechanism. For example, the stripper finger must be actuated at precisely the right moment in the sequence of twisting operations. This requires modification of the other components of the mechanism in order that the stripper be synchronized therewith. Furthermore, the stripper finger must be precisely adjusted to travel just the right distance to dislodge the twisted wire from the hook.

The general purpose of the present invention is to provide a twister hook having a particular configuration capable of twisting together the ends of a strand encircling a bale of hay and permitting the twisted ends to be stripped therefrom solely by rearward movement of the bale of hay.

A general object of this invention is the provision of a self-stripping twister hook, that is, a hook that requires no additional equipment for dislodging the twisted wire therefrom, thereby reducing the complexity of the twisting mechanism and simplifying the twisting operation.

Another object is the provision of a self-stripping twister hook wherein the stripping is effected solely by the configuration of the twister hook.

These and other objects of the present invention will become apparent to those skilled in the art as a preferred embodiment of the invention is disclosed in the following specification and claims taken in conjunction with the drawings in which:

Figure 1:
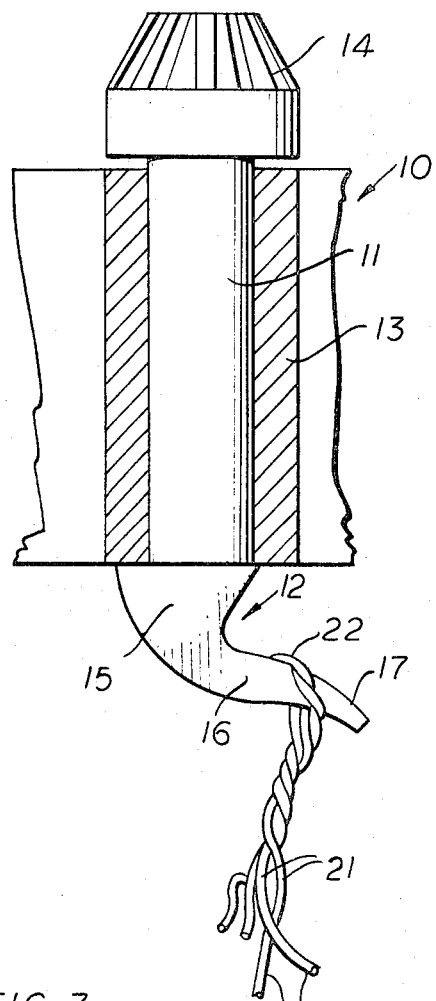
FIGURE 1 is a side elevation of the twister hook showing the disposition of the twisted wire thereon at the conclusion of the twisting phase.
Figure 2:
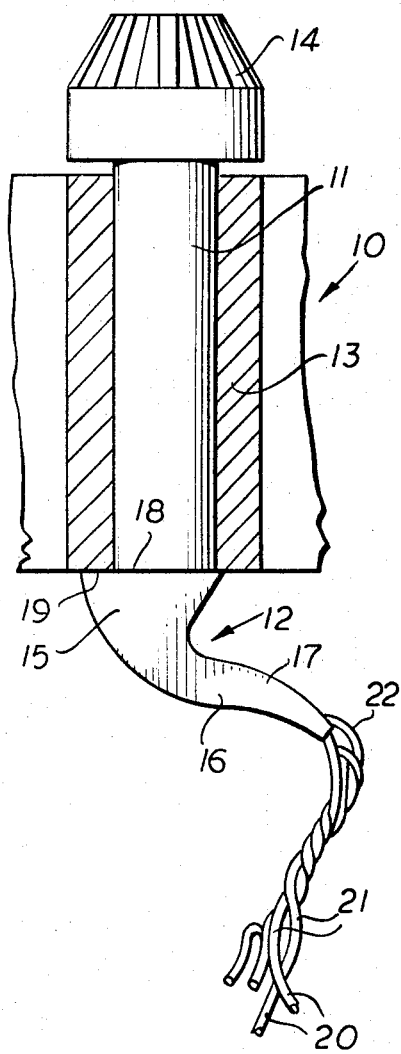
FIGURE 2 is a similar view showing the twisted wires being stripped therefrom.
Figure 3:
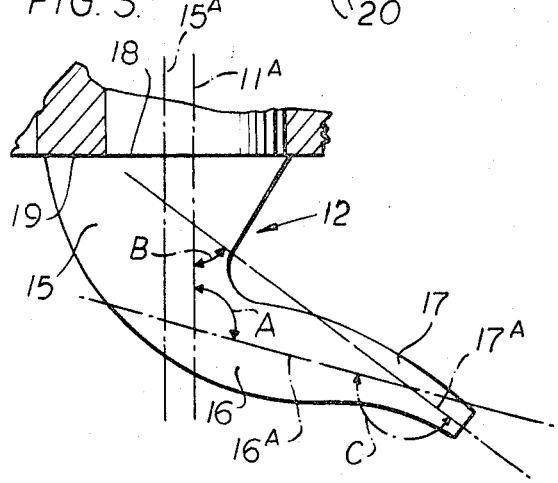
FIGURE 3 is a more detailed side elevation of the twister hook which shows the angular relationship of the upper, intermediate, and end portions of the hook.

A wire twister 10 constructed in accordance with the principles of the present invention comprises generally a shaft 11 and a twister hook 12 rigidly secured to one end of the shaft 11. The shaft 11 is journaled to the housing 13 and carries at its upper end a bevel gear 14. By referring to the previously mentioned Raney patent, it will be seen that bevel gear 14 corresponds to bevel gear 61 shown therein and is aligned to mesh with segmental gear 60 which provides the drive means for the wire twister 10.

The novel twister hook 12 is particularly characterized as having a frusto-conical shank section 15, an intermediate section 16 projecting laterally from the apex of shank section 15 and extending generally radially outwardly and transversely with respect to the axis 11a of shaft 11 and a downturned outer section 17 extending radially outwardly from the intermediate section 16.

The frusto-conical section 15 has an upwardly facing base 18, a portion of which slidingly abuts an annular portion of frame 13 as at 19. The sections 15, 16, and 17 project generally in the direction of their respective axes, designated as 15a, 16a, and 17a; and are integrally formed giving the hook 12 a smooth exterior surface tapering from the base 18 to the outer extremity of section 17. The particular arrangement of the axes relative to one another, while not critical, must be within certain limits in order to function in accordance with the principles of the twister 10 as set forth herein. The laterally projecting intermediate section 16 must provide a sufficient horizontal dimension for carrying loops 22 of strand end portions 21 of strand 20 during the twisting phase of the operation. The axis 17a of the downturned outer section 17 must be oriented with respect to the intermediate section 16 so as to permit the stripping of loops 22 therefrom at the conclusion of the twisting phase and yet must provide a sufficient horizontal dimension to preclude premature stripping.

A particular configuration of the twister hook 12 which will satisfy the operational requirements set forth above, and as disclosed in this preferred embodiment of the invention is as follows:

The axis 15a of the frusto-conical section 15 is situated parallel to the axis 11a of shaft 11 and is disposed radially therefrom. The general direction of the projection of section 16 as indicated by axis 16a forms an angle A with axis 11a, the magnitude of angle A being approximately 104°. The direction of projection of the downturned outer section 17 as indicated by axis 17a forms an angle B with the axis 11a and an angle C with the axis 16a, the magnitude of angles B and C being approximately 52° and 156°, respectively. It should be noted that the axes 15a, 16a and 17a lie in a common imaginary plane passing through the axis of rotation 11a. It will be appreciated that a wide range of values for angles A, B. and C may be tolerated and still provide the operational requirements as set forth above.

In operation, assume that the automatic wire tier as described in the Raney patent has concluded the twisting phase positioning the hook 12 in the home position as shown in FIGURE 1. The general direction of the projection of sections 16 and 17 is transverse to that of movement of the bale (not shown) encircled by strands 20. As the bale is forced rearwardly by a succeeding bale, the tension in the strands 20 pulls the wire loops 22 from the intermediate section 16 over the downturned outer section 17. Upon reaching the downturned outer section 17, the loops 22 readily slip free of the hook 12. Operational characteristics of the baler of a type in which it is contemplated that the novel twister 10 will operate, aids in the stripping process. The reciprocating action of the baler in forming a succeeding bale vibrates the formed bale being discharged from the bale chamber. The vibration is transmitted through the wire twists and has a tendency to bounce the loops 22 free from the twister hook 12.

The preferred embodiment of the invention as presented herein shows the novel twister device as functioning in a twister mechanism described in U.S. Patent No. 2,513,967 for illustration only. It should be emphasized that the novel twister device is not to be limited by that patent but many modifications and variations may be made without departing from the spirit and scope of the invention as set forth in the appended claims.

What is claimed is:

1. A self-stripping wire twister for use in hay balers, comprising:
a shaft rotatable about its axis; and
a hook including a shank portion mounted on one end of said shaft, an intermediate portion projecting laterally from said shank portion, and an outer portion extending obliquely from said intermediate portion in a direction generally radially outwardly and axially downwardly with respect to the axis of rotation.

2. The self-stripping wire twister as recited in claim 1 wherein said shank, intermediate, and outer portions have principal axes lying in the same plane, the axis of said shank portion extending generally parallel to the axis of rotation, the axis of said intermediate portion intersecting the axis of said shank portion and forming therewith an included angle greater than 90°, and the axis of said outer portion intersecting the axis of said intermediate portion and forming therewith an included angle greater than 90°.

3. The self stripping hook as recited in claim 2 wherein said portions are integrally formed, the outer surface being of smooth tapering configuration having the greatest sectional dimension in said shank portion and least sectional dimension in said outer portion.

4. A self-stripping wire twister for use in wire balers, comprising:
a shaft rotatable about its axis; and
a hook extending transversely from said shaft, said hook including a generally frusto-conical inner portion having its principal axis generally parallel to said shaft, an intermediate portion integral with said frusto-conical inner portion and extending generally radially with respect to said shaft and having a generally frusto-conical configuration, and an outer frusto-conical portion integral with said intermediate portion and having its principal axis extending obliquely downwardly with respect to the axis of said shaft at an included angle greater than 90°, said hook tapering continuously outwardly providing a smooth exterior surface.

References Cited

UNITED STATES PATENTS

| | | | |
|---|---|---|---|
| 909,272 | 1/1909 | Wygant | 100—31 X |
| 1,040,786 | 10/1912 | Seehafer et al. | 100—22 |
| 2,472,510 | 6/1949 | Bennett | 140—149 |
| 2,513,967 | 7/1950 | Raney et al. | 100—22 |

FOREIGN PATENTS

| | | |
|---|---|---|
| 719,441 | 11/1931 | France. |

BILLY J. WILHITE, *Primary Examiner.*